United States Patent Office 2,833,751
Patented May 6, 1958

2,833,751
NOVEL VINYLOXYALKYLAMIDONITRILES, POLYMERS THEREOF, AND THEIR PRODUCTION

Leo S. Luskin and Peter L. de Benneville, Philadelphia, Pa., assignors to Rohm & Haas Company, Philadelphia, Pa., a corporation of Delaware No Drawing. Application November 29, 1955
Serial No. 549,851

14 Claims. (Cl. 260—85.5)

This invention is concerned with novel vinyl ethers, polymers and copolymers thereof, and with processes for their production. It is particularly concerned with the production of vinyloxyalkylamidonitriles.

The vinyloxyalkylamidonitriles of the present invention have the structure of Formula I is follows:

(I)  $$CH_2=CHOZNACN$$
       $$| $$
       $$C=O$$
       $$| $$
       $$R$$

where Z is an alkylene group having 2 to 6 carbon atoms, the oxygen and the nitrogen being attached to different carbons thereof, A is selected from the group consisting of cyclohexylidene, $$-CH_2-, \; -CH(CH_3)-, \; -CH_2CH_2-$$
$$-CH(CH_3)CH_2-, \; -CH(CH(CH_3)_2)-, \; -CHR'-$$

where R' is an alkyl group having 1 to 8 carbon atoms, and $$-C(R')-$$
$$\;\;\;|$$
$$\;\;\;R^2$$

where $R^2$ is selected from the group consisting of methyl and ethyl, and R' is as just defined, and R is selected from the group consisting of H, alkyl groups having 1 to 18 carbon atoms, aryl groups having 6 to 10 carbon atoms, including phenyl, naphthyl, alkylphenyl in which the alkyl group has 1 to 4 carbon atoms, halogenated phenyl and naphthyl groups, especially those containing chlorine or bromine, benzyloxy, and alkoxy and alkoxyalkyl groups of the formulas $R^3O-$ and $R^3OR^4-$ where $R^3$ and $R^4$ are selected from the group consisting of the same and different alkyl groups having 1 to 4 carbon atoms; with the proviso that when R is H, the two carbon atoms in A and Z that are attached directly to the N atom therebetween each carry two hydrogen atoms.

The compounds of Formula I are obtained from aminonitriles of Formula II:

(II)         $$CH_2=CHOZNHACN$$

where Z and A are as defined above. These aminonitriles are obtained by reacting an aminoalkyl vinyl ether of Formula III:

(III)          $$CH_2=CHOZNH_2$$

with a member selected from the group consisting of alkylene cyanohydrins of the formula HOACN, including ketone cyanohydrins of the formula $$\begin{array}{c} H \\ | \\ O \\ | \\ R'-C-CN \\ | \\ R^2 \end{array}$$

wherein R' and $R^2$ are as defined hereinabove, and aldehyde cyanohydrins of the formula $$\begin{array}{c} H \\ | \\ R'-C-CN \\ | \\ O \\ | \\ H \end{array}$$

R' being as defined above, also acryolnitrile, methacrylonitrile, and crotononitrile.

Examples of the vinyl esters of Formula III include:

$$CH_2=CHO(CH_2)_6NH_2$$
$$CH_2=CHOCH_2CH_2NH_2$$
$$CH_2=CHOCH_2CH_2CH_2NH_2$$
$$CH_2=CHOCH_2CH(CH_3)NH_2$$
$$CH_2=CHOCH(CH_3)CH_2NH_2$$
$$CH_2=CHOCH_2C(CH_3)_2NH_2$$
$$CH_2=CHOC(CH_3)_2CH_2NH_2$$
$$CH_2=CHOCH_2CH_2CH_2CH_2NH_2$$
$$CH_2=CHOC(CH_3)_2CH_2CH(CH_3)NH_2$$
$$CH_2=CHOCH_2C(CH_3)_2CH_2NH_2$$

Examples of cyanohydrins are those of formaldehyde, acetaldehyde, propionaldehyde, butyraldehyde, valeraldehyde, caproaldehyde, caprylaldehyde, and pelargonaldehyde, acetone, ethyl methyl ketone, diethyl ketone, methyl isopropyl ketone, ethyl n-propyl ketone, methylbutyl ketone, methylhexyl ketone, etc.

The reaction between the cyanohydrin and the amine of Formula III may be carried out in the absence of a solvent, but is generally effected in the presence of water or in non-reactive solvents, such as benzene, toluene, xylenes, petroleum ether, ether, diisopropyl ether, dibutyl ether, dioxane, ethanol, methanol, isopropanol, etc. The amine of Formula III and the cyanohydrin are preferably employed in equimolar or substantially equimolar amounts. Instead of introducing a preformed cyanhydrin into the solution of the amine, the cyanohydrin may be prepared in situ in the reaction medium in the presence of the amine of Formula III by the addition of equimolar amounts of hydrogen cyanide and ether and aldehyde or ketone. The cyanohydrin is produced rapidly and then reacts with the amine. The reaction is effected at a temperature of 0° to 50° C. It is exothermic in character and may take various periods of time depending on the particular temperature and the particular reactants. Generally, 4 to 24 hours' standing is adequate. Water is split out as a by-product of the reaction, and the aminonitrile product of Formula II is recovered from the reaction mixture by the addition of a solvent that is immiscible with water, such as benzene, toluene, xylenes, chloroform or other low-boiling chlorinated solvents. The water layer is removed and the remaining layer consisting of the solution of the product in benzene or other solvent may be dried over a suitable dehydrating agent, such as magnesium sulfate, sodium sulfate, or calcium chloride. After distilling off the solvent, the product remains. Many of the products are distillable and may be purified in this manner. Those obtained from ketone cyanohydrins are generally not distillable.

In the reaction of the amine of Formula III with an unsaturated nitrile, specifically acrylonitrile, methacrylonitrile, and crotononitrile, the reactants are utilized in equimolar or substantially equimolar amounts, although an excess of either may be present. The use of solvents for this reaction is optional. If desired, such solvents may be used as t-butanol, acetonitrile, nitromethane, and chlorinated solvents, such as chloroform, carbon tetrachloride, and ethylene dichloride. If desired, an excess of the amine of Formula III may be used as a solvent. The reaction may be effected at a temperature from room temperature (e. g., 15° C.) up to 100° C. The mixture of reactants may be allowed to stand for 4 to 48 hours, or they may be heated to temperatures up to 100° C. to hasten the reaction so that it may be completed within a period of 3 to 8 hours. After completion of the reaction, the solvents are distilled off and the product may be purified in any suitable manner, if necessary or desired.

In order to produce the new compounds of Formula I, the amine nitrogen of an aminonitrile of Formula II is acylated. This may be effected in a number of ways depending on the acyl group to be introduced.

(1) Compounds of Formula I in which R is an alkyl group having 1 to 17 carbon atoms, an alkoxyalkyl group of the formula $R^3OR^4$, or an aryl group having 6 to 10 carbon atoms, including phenyl, naphthyl, alkylphenyl, chlorophenyl, bromophenyl, etc. may be made by reacting the aminonitrile of Formula II with an acyl halide of the formula RCOX, where X is selected from the group consisting of chlorine and bromine. Examples of the acyl halides include acetyl chloride and bromide, propionyl chloride, and bromide, butyryl chloride, valeryl chloride, lauroyl chloride, myristyl chloride, palmityl chloride, stearoyl chloride or bromide, benzoyl chloride, toluoyl chloride, 2,4-dimethyl-benzoyl chloride, naphthoyl chloride, p-chloro-benzoyl chloride, methoxy-acetyl chloride, ethoxyacetyl chloride, butoxy-acetyl chloride, α-ethoxy-propionyl chloride, β-ethoxy-propionyl chloride, γ-butoxy-butyryl chloride, etc.

This reaction of the aminonitrile of Formula II with the acyl halide is carried out at a temperature from 0° to 100° C. and preferably at room temperature or in the range of 15° to 40° C. A basic compound for accepting the hydrogen halide liberated by the reaction is introduced into the mixture of reactants and, for this purpose, any tertiary amine is suitable. Examples of such tertiary amines include trimethylamine, triethylamine, pyridine, triethanolamine, benzyldimethylamine and N,N-dimethylaniline. Depending upon the particular reactants and especially the particular acyl halide which may be either a bromide or a chloride, cooling may be needed to keep the reaction within the temperature range desired, or, on the other hand, heat may be needed to raise it to the desired temperature. With many of the acyl halides, the reaction is preferably kept below 40° C., but with sluggish acyl chlorides or with hindered amines of Formula II, it may be necessary to heat the reaction mixture up to 100° C. in order to obtain completion thereof in a reasonable time. The reaction may be effected in the presence of excess amine as the solvent or in any other non-aqueous medium. Inert solvents, such as benzene, toluene, or xylenes, may be employed. Unless excess amine is desired to serve as the solvent or part of the solvent, the acyl halide and the aminonitrile are employed in substantially equimolar proportions or with a slight excess of the aminonitrile. In order to isolate the product, the reaction mixture is filtered to remove the hydrogen halide salt of the amine. It is then distilled to remove solvent leaving the product which, if desired, may be distilled for purification.

(2) Compounds of Formula I in which R is benzyloxy or an alkoxy group $R^3O$ are obtained when an aminonitrile of Formula II is reacted with benzyl chloroformate or an alkyl chloroformate of the formula ClCOOR

in which $R^3$ may be methyl, ethyl, propyl, isopropyl, or butyl.

In this reaction, the chloroformate and the aminonitrile of Formula II are preferably used in substantially equimolar proportions and the reaction is effected in aqueous medium. At least one mole of a hydrogen halide acceptor, such as alkali metal bicarbonates, carbonates, or hydroxides, such as those of lithium, and especially sodium or potassium, is used for each mole of chloroformate used in the reaction. The reaction is exothermic and occurs at a temperature of 0° to 50° C. quite readily. Conveniently, room temperature is employed, no heat being required. However, it may be necessary to control the temperature below the 50° C. limit either by cooling or by controlling the rate of addition of one reactant to the other. Instead of using the inorganic acceptors for hydrogen halide, tertiary amines such as those mentioned hereinabove may be used for this purpose. The reaction in any event is vigorous and may be allowed to occur over a period of one hour to twenty-four hours. Generally, the reaction mixture separates into aqueous and organic layers. Any part of the product of Formula I present in the water layer may be extracted therefrom with an immiscible solvent, such as benzene, toluene, chloroform, and ethylene dichloride. The extracts are added to the oil layer and the combined mixture thereby obtained is dehydrated, such as by means of magnesium sulfate, sodium sulfate, calcium chloride. The solvent is distilled off leaving the product which may be easily purified by distillation. The products of Formula I obtained by this reaction are somewhat more stable than those obtained by the first procedure described hereinabove and by the third procedure described hereinbelow.

(3) Compounds of Formula I in which R is H or $CH_3OCH_2$— and in which those carbon atoms of groups Z and A, which are attached directly to the nitrogen, are unsubstituted may be obtained by reacting an aminonitrile of Formula II with an alkyl formate, especially methyl formate, or with an alkyl ester, especially the methyl ester, of methoxyacetic acid. Although the methyl esters are preferred, the alkyl group may have from 1 to 4 or more carbon atoms.

In this third procedure, it is essential that the carbons of group Z and A, which are directly connected to the nitrogen in Formula I, each carry two hydrogen atoms. Except for this limitation, any aminonitrile of Formula II will react with an alkyl formate and especially methyl formate or with an alkyl ester of methoxyacetic acid, especially the methyl ester. The reaction is effected under anhydrous conditions. It may be effected using excess of the formate or methoxyacetate as a part of the solvent. For example, it is generally most practical to employ from 1.5 to 3 or more moles of the ester per mole of the aminonitrile of Formula II. Anhydrous solvents, such as dimethylformamide, dimethylacetamide, benzene, toluene, xylene, and ketones, such as acetone, methylethyl ketone, and dioxane, are suitable. The solvent may be selected to enable higher temperature to be employed to accelerate the reaction. Depending upon the particular ester, various temperatures may be employed from about 40° C. up to about 140° C.; for example, in using methyl formate, a temperature of 40° to 50° C. for about 4 to 16 hours is quite satisfactory, the temperature being obtained by heating the reaction mixture to reflux. In the case of methyl methoxyacetate, refluxing at 130° C. for about 8 to 12 hours is a suitable procedure. When higher temperatures are employed, the alcohol (methanol in the case of the methyl esters) is continuously distilled off during refluxing operation. At the completion of the reaction, excess formic or methoxyacetic acid ester is distilled off as well as any alcohol remaining, such as methanol. This leaves the product which may be purified further if desired but is sufficiently pure for many purposes.

The amidonitriles of the present invention are generally liquids or waxy solids which are of generally low-melting points. Some of the products are distillable, though in many cases extreme low pressure or care has to be used. The products are generally insoluble or have a low solubility in water. Many of them are soluble in such solvents as the ethoxyethyl acetate, acetone, acetonitrile, dimethylformamide, dimethylacetamide, and dioxane.

The monomeric compounds of Formula I are useful as fungicides and insecticides. They also serve as lubricating and softening agents for leather and textiles, especially of cellulosic type, such as rayon and cotton. They may be used as components of shoe polish and of textile dressings and sizes. They are useful as intermediates for producing many other useful compounds of a wide variety. Thus, they may be reduced to produce amino groups in place of the nitrile groups. They react with alcohols to produce acetals and they are also reactive with dicyandiamides to produce new acyl guanamines which are described and claimed in our copending application Serial No. 549,852, filed on even date herewith. The monomeric compounds are also adapted to be polymerized in bulk by means of boron fluoride etherate. They may be copolymerized with other known polymerizable comonomers by bulk, solution, aqueous emulsion procedures or suspension procedures. For this purpose, free radical catalysts of the azo type are useful including azodiisobutyronitrile, dimethyl azodiisobutyrate and so on. They may thus be copolymerized with other monoethylenically unsaturated compounds including esters of acrylic acid, such as methyl acrylate, ethyl acrylate, butyl acrylate, 2-ethylhexyl acrylate, 3,5,5-trimethylhexyl acrylate, dodecyl acrylate, ethoxyethyl acrylate, butoxyethyl acrylate, phenoxyethyl acrylate, cyclohexyl acrylate, benzyl acrylate, and the like, acrylamides, acrylonitrile, methacrylonitrile, esters of methacrylic acid including methyl, ethyl, propyl, butyl, hexyl, octyl, dodecyl, cetyl, ethoxyethyl, butoxyethyl, cyclohexyl, benzyl, and dimethylaminoethyl methacrylates, vinyl esters such as vinyl acetate, ureidoethyl vinyl ether, styrene, and vinylpyridine.

The polymers, and especially thet copolymers, are useful as components of adhesives, coatings, textile finishes and the like.

Example A (a) Glycolonitrile (162.8 grams of a 70% aqueous solution, 2 mols) is added rapidly to β-aminoethyl vinyl ether (174 grams, 12 moles) at 20° to 30° C. After five hours, benzene (300 ml.) is added and the water layer is separated. Distillation of the oil layer gives 190 grams of N-β-vinyloxyethylaminoacetonitrile as a colorless oil, boiling in the range 65° to 75° C./0.1 mm. Hg. Found 21.8% N. Theory 22.3% N.

(b) By the procedure of part (a) except for the substitution of other vinyloxyalkylamines named for the vinyloxyethylamine, the following compounds are obtained:

(1) N-β-vinyloxyisobutylaminoacetonitrile from vinyloxyisobutylamine.

(2) N-6-vinyloxyhexylaminoacetonitrile from 6-vinyloxyhexylamine.

(3) N-γ-vinyloxypropylaminoacetonitrile from γ-vinyloxypropylamine.

Example B

Freshly distilled lactonitrile (213 grams, 3 moles) is added during a period of 30 minutes to β-aminoethyl vinyl ether (261 grams, 3 moles) at room temperature. Stirring is continued for 5 hours. Benzene (400 ml.) is added and the water layer is separated. Distillation of the benzene layer gives 366 grams (an 87% yield) of α-[-N-β-vinyloxyethylamino]-propionitrile as a pale yellow oil boiling in the range 65° to 69° C./0.2 mm. Hg, $n_D^{25}=1.4503$. Anal. Calculated: N, 20.0%. Found: N, 19.7%.

Example C

Isobutyraldehyde cyanohydrin (99 grams, 1 mole) is added slowly to β-aminoethyl vinyl ether (87 grams, 1 mole) at 25° to 30° C. After stirring for 5 hours, the water layer is removed by the addition of 200 ml. of benzene. The benzene is distilled to give 157 grams of a yellow residual oil. Further distillation gives 151 grams (a 93% yield) of α-[-N-β-vinyloxyethylamino]-isovaleronitrile as a colorless oil boiling in the range 77° to 82° C./0.6 mm. Hg, $n_D^{25}=1.4490$. Anal. Calculated: N, 16.7%. Found: N, 16.6%.

Example D

Freshly distilled acetone cyanohydrin (85 grams, 1 mole) is added to β-aminoethyl vinyl ether (87 grams, 1 mole) in 10 minutes at 25° to 40° C. The mixture is cooled in an ice-bath as needed and stirred at 25° to 30° C. for 3 hours. Chloroform (150 ml.) is then added to separate the water. Evaporation of the chloroform at reduced pressure leaves 144 grams of α-[-N-β-vinyloxyethylamino]-isobutyronitrile as a colorless oil, $$n_D^{25}=1.4478$$

Anal. Calculated: N, 18.2%. Found: N, 18.2%

Example E

Cyclohexanone cyanohydrin (25 grams) is added to a solution of β-aminoethyl vinyl ether (17.4 grams) in benzene (100 ml.) in 15 minutes at 20° to 32° C. The temperature is controlled by the rate of addition of the cyanohydrin and no external cooling is required. The mixture is stirred for two hours. The benzene layer is separated from the small water layer and evaporated under reduced pressure below 50° C. to give 21.5 grams of 1-[β-vinyloxyethylamino]cyclohexanenitrile as a yellow oil, $n_D^{25}=1.4777$. Anal. Calculated: N, 14.4%. Found: N, 14.0%.

Example F (a) Acrylonitrile (106 grams, 2 moles) is added, with cooling, to aminoethyl vinyl ether (174 grams, 2 moles). After 6 hours, volatile material is evaporated with a water-aspirator on the steam bath. The orange oily residue weighs 250 grams (an 89% yield), N 20.0% by analysis.

Distillation gives 196 grams (a 70% yield) of β-N-β-vinyloxyethylaminopropionitrile as a colorless product boiling in the range 79° to 81° C./0.4 mm. Hg and 46.5 grams orange residue. The colorless product had an $N_D^{25}=1.4599$ and an analysis of 19.8% N. Theory 20.0% N.

(b) By the procedure of part (a) substituting 2 moles of methacrylonitrile for acrylonitrile, α-methyl-β-(N-vinyloxyethylamino)-propionitrile is obtained in good yield.

(c) Repeating the process of part (a) but replacing the acrylonitrile with crotononitrile produces β-(N-vinyloxyethylamino)-butyronitrile.

(d) Repeating the part (a) process but with β-vinyloxyisobutylamine produces β-(N-β-vinyloxyisobutylamino)-propionitrile.

Example G

Hydrogen cyanide (54 grams) is added to a solution in 650 cc. of 95% ethyl alcohol of 186 grams of cyclohexanone and 175 grams of β-aminoethyl vinyl ether. The mixture is maintained at room temperature and there is isolated by the procedure described in Example E above, the product 1-(N-β-vinyloxyethylamino)-1-cyclohexane-nitrile.

Example H

To a solution of hydrogen cyanide (81 grams, 3 moles) and piperidine (5 ml.) in diethyl ether (200 ml.), isobutyraldehyde (144 grams, 2 moles) is added in 1 hour. The reaction flask is cooled with an ice-water bath to maintain the temperature below 25° C. The reaction is allowed to stand for 3 hours. Aminoethyl vinyl ether (174 grams, 2 moles) is then added in 2 hours at 25° to 30° C. The reaction mass is allowed to stand overnight. Benzene is added to help the separation of water. The oil layer is distilled to give 258 grams (a 77% yield) of α-[-N-β-vinyloxyethylamino]-isovaleronitrile as a pale yellow oil boiling in the range 85° to 90° C./0.9 mm. Hg. Anal. Calculated: N, 16.7%. Found: N, 16.4%.

Example I

Acetyl chloride (39.3 grams, 0.5 mole) is added slowly to a solution of α-N-β-vinyloxyethylaminopropionitrile (70 grams, 0.5 mole) and triethylamine (50.4 grams, 0.5 mole) in benzene (150 ml.) at 15° to 25° C. with cooling. Stirring is continued overnight. Triethylamine hydrochloride is collected, washed with benzene and dried; it weighs 68 grams (calc. 68.7 grams). The solvent is removed under reduced pressure on the steam bath to give 92.7 grams (calc. 91 grams) of an amber oil, $n_D^{25}=1.4731$. Distillation gives 80.5 grams (an 88% yield) of α-(N-β-vinyloxyethylacetamido)propionitrile as a yellow oil, boiling in the range 98° C./0.15 mm. Hg to 115° C./0.25 mm. Hg, mainly at 110° C./0.2 mm. Hg, $n_D^{25}=1.4710$.

*Example 2*

Methyl formate (120 grams, 2 moles) and N-β-vinyloxyethylaminoacetonitrile (120 grams, 1 mole) are heated together under gentle reflux at 40° C. for 8 hours. Evaporation of the excess ester under reduced pressure gives 150 grams (calc. 154 grams) of N-(β-vinyloxyethyl)formamidoacetonitrile as a residual brown oil, N 18.0% and 18.2% found (calc. 18.2%).

*Example 3*

Ethyl chloroformate (95.4 grams, 0.88 mole) is added slowly to a mixture of β-N-(β-vinyloxyethyl)aminopropionitrile (123 grams, 0.88 mole), sodium bicarbonate (74 grams, 0.88 mole) and water (275 ml.) at 15° to 25° C. The mixture is stirred overnight. The oil layer is combined with chloroform (two 50 ml. portions) extracts of the aqueous layer and then evaporated under reduced pressure. The red oily residue containing the product β-(N-ethoxycarbonyl-N-β-vinyloxyethylamino)propionitrile weighs 183 grams (a 97% yield). Distillation gives a 90% yield of the essentially pure product as a yellow oil, boiling in the range of 107° to 112° C./0.2 mm. Hg.

*Example 4*

By the procedure of Example 1, acetyl chloride is reacted with N-β-vinyloxyethylaminoacetonitrile producing a 62% yield of N-β-vinyloxyethylacetamidoacetonitrile boiling in the range 113° to 125° C./0.25 mm. Hg, $n_D^{25}=1.4760$, 16.4% N by analysis (16.7% N calc.).

*Example 5*

(a) By the process of Example 1, benzoyl chloride (.05 mole) is reacted with α-(N-β-vinyloxyethylamino)propionitrile (0.5 mole) producing α-(N-β-vinyloxyethylbenzamido)propionitrile having $n_D^{25}=1.5286$ and a nitrogen analysis of 11.2% (11.5% calc.) before distillation.

(b) Part (a) is repeated replacing the nitrile reactant with α-(N-β-vinyloxypropylamino)propionitrile producing the compound α-(N-β-vinyloxypropylbenzamido)propionitrile.

*Example 6*

By the process of Example 1, propionyl chloride (0.5 mole) is reacted with β-N-β-vinyloxyethylaminopropionitrile (0.5 mole) producing in 50% yield the product β-[N-β-vinyloxyethylpropionamido]-propionitrile.

*Example 7*

Example 6 is repeated substituting 0.5 mole of benzoyl chloride for the propionyl chloride, yielding β-[N-β-vinyloxyethylbenzamido]-propionitrile. Found 11.2% N (11.5% calc.).

*Example 8*

(a) By the process of Example 1, acetyl chloride (0.5 mole) is reacted with 0.5 mole of α-[N-β-vinyloxyethylamino]-isovaleronitrile of the formula

producing α-[N-β-vinyloxyethylacetamido]-isovaleronitrile of the Formula IV:

(IV) 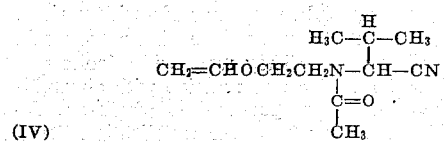

(b) The process of part (a) hereof is repeated, substituting for the nitrile reactant in successive runs,
(1) The nitrile of part (b) (1) of Example A.
(2) The nitrile of part (b) (2) of Example A.
(3) The nitrile of part (b) (3) of Example A.

*Example 9*

By the process of Example 2, 2 moles of methyl formate are reacted with 1 mole of β-[N-β-vinyloxyethylamino]-propionitrile, producing β-[N-β-vinyloxyethylformamido]-propionitrile, having $n_D^{25}=1.4880$ and analyzing 16.5% N (16.7% N calc.).

*Example 10*

Palmitoyl chloride (69 grams, 0.25 mole) is added to a solution of β-[N-β-vinyloxyethylamino]-propionitrile (35 grams, 0.25 mole) in pyridine (65 ml.) in 1¾ hours at 27° to 42° C. Cooling is used to keep the temperature below 42° C. An equal amount of pyridine is then added to facilitate stirring, which is continued for 2½ hours. Pyridine hydrochloride is removed by filtration. The filtrate is dissolved in 250 ml. of benzene and washed five times with 100 ml. portions of water. The benzene is distilled under reduced pressure to give 78.5 grams (86%) of a dark oil which solidifies to a tan wax. Catalytic hydrogenation proves that the vinyl group is intact, for practically 1 mole of gas is absorbed. Anal. Calculated: N, 7.4%. Found: N, 7.0%.

*Example 11*

By the procedure of Example 2, methyl methoxyacetate (2 moles) is reacted with 1 mole of α-[N-β-vinyloxyethylamino]-isovaleronitrile producing a 93% yield of a compound of formula V:

(V) 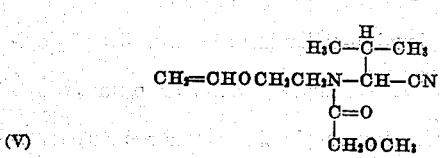

Found 11.9% N; 11.7% (calc.).

*Example 12*

(a) By the procedure of Example 3, ethyl chloroformate (1 mole) is reacted with 1 mole of N-β-vinyloxyethylaminoacetonitrile producing N-ethoxycarbonyl-N-β-vinyloxyethylaminoacetonitrile of the Formula VI having $n_D^{25}=1.4546$:

VI) 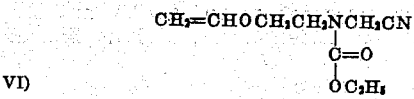

(b) Part (a) hereof is repeated, substituting for the nitrile reactant, in each of several runs,
(1) The nitrile of part (b) (1) of Example A.
(2) The nitrile of part (b) (2) of Example A.
(3) The nitrile of part (b) (3) of Example A.

*Example 13*

By the procedure of Example 3, ethyl chloroformate (1 mole) is reacted with 1 mole of α-N-β-vinyloxyethylaminopropionitrile producing a compound having the Formula VII having $n_D^{25}$=1.4525 and 12.9% N (13.2% N calc.):

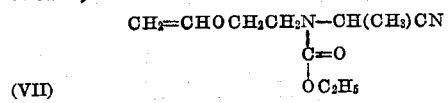

(VII)

Example 14

(a) By the procedure of Example 3, ethyl chloroformate (1 mole) is reacted with 1 mole of α-[N-β-vinyloxyethylamino]-isovaleronitrile producing a 97% yield of an oil boiling in the range 85° to 90° C./0.15 mm. Hg and containing 11.8% N corresponding to a product of Formula VIII having 11.7% N by calculation:

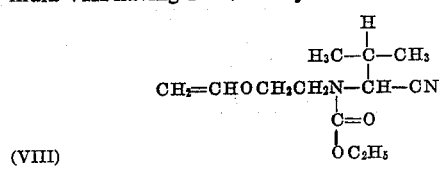

(VIII)

(b) By the same procedure, substituting for the isovaleronitrile, 1 mole of α-(N-β-vinyloxyethylamino)-isobutyronitrile, there is obtained an 86% yield of α-(N-ethoxycarbonyl-N-β-vinyloxyethylamino) - isobutyronitrile of the Formula IX:

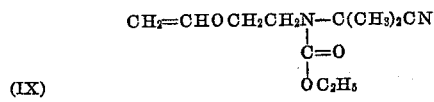

(IX)

Example 15

By the procedure of Example 3 (omitting the final distillation), ethyl chloroformate (1 mole) is reacted with 1 mole of 1-(β-vinyloxyethylamino)-1-cyclohexane-nitrile. The product has $n_D^{25}$=1.4632 and contains 9.9% N. It corresponds to 1 - (N-ethoxycarbonyl-N-β-vinyloxyethylamino)-cyclohexane-nitrile of Formula X having 10.4% N (theory):

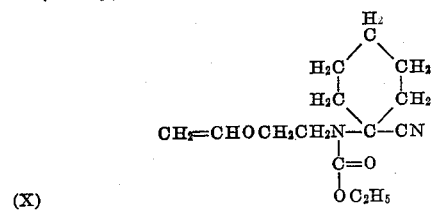

(X)

Example 16

The compounds of the preceding examples are useful fungicides. For example, a spray containing a 0.1% concentration of N-β-vinyloxyethylformamidoacetonitrile in a typical spray solvent, such as solvent naphthas, methylated naphthalenes, and so on effects a 100% kill of *Stemphylium sarcinaeforme* and is nonphytotoxic to tomatoes. At a 10% concentration in a dust formulation, this compound effects a 42% kill of rice weevils. When R in Formula I becomes a hydrocarbon or alkoxy group, the compounds become even more effective fungicides and insecticides.

Example 17

The compounds of the preceding examples are excellent in their softening and lubricating action on such materials as leather and textiles, especially of cellulosic type. Illustratively, when the product of Example 10 is rubbed on the uppers of shoes, good flexibility is obtained.

Example 18

(a) A reaction vessel is charged with 300 grams of ethoxyethyl acetate, 35 grams of N-(β-vinyloxyethylformamido)-acetonitrile, 215 grams of methyl methacrylate, and 1.7 grams of azodiisobutyronitrile. The mixture is agitated while an inert atmosphere of nitrogen is maintained in the vessel over the reaction mixture. The contents are heated to 80° C. and held at about this temperature for four hours. An additional charge of 0.5 gram of the azo catalyst in 35 grams of ethoxyethyl acetate is added and the polymerization is continued for an additional three hours at about 80° C. After filtration, at 80° C. under 40 pounds per square inch pressure, a substantially colorless hard polymer is obtained. A 15% solution is formed in ethoxyethyl acetate and cast to form a tough film.

(b) In similar fashion, the following mixtures are copolymerized.

(1) 50 parts of α-(N-β-vinyloxyethylacetamido)propionitrile and 50 parts of ethyl acrylate. This polymer produces a soft film.

(2) 25 parts of β-(N-ethoxycarbonyl-N-β-vinyloxyethylamino)propionitrile and 75 parts of acrylonitrile. Fibers and films made by extrusion of a 20% solution of this copolymer in dimethylformamide are highly resilient and more readily dyeable than the homopolymer of acrylonitrile.

(3) 10 parts of the compound of Formula IV (Example 8 (a)), 60 parts of methyl methacrylate, and 30 parts of styrene. This polymer forms a hard film.

It is to be understood that changes and variations may be made without departing from the spirit and scope of the invention as defined in the appended claims.

We claim:

1. A composition of matter comprising a compound of Formula I:

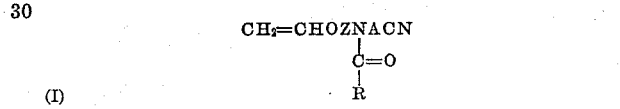

(I)

where Z is an alkylene group having 2 to 6 carbon atoms, the oxygen and the nitrogen being attached to different carbons thereof, A is selected from the group consisting of cyclohexylidene, —CH$_2$—, —CH(CH$_3$)—, —CH$_2$CH$_2$—, —CH(CH$_3$)CH$_2$—, —CH(CH(CH$_3$)$_2$)—, —CHR'— and

where R' is an alkyl group having 1 to 8 carbon atoms and R² is selected from the group consisting of methyl and ethyl, and R is selected from the group consisting of H, alkyl groups having 1 to 18 carbon atoms, phenyl, naphthyl, alkylphenyl in which the alkyl group has 1 to 4 carbon atoms, halogenated phenyl and naphthyl groups, benzyloxy, and alkoxy and alkoxyalkyl groups of the formulas R³O— and R³OR⁴— where R³ and R⁴ are selected from the group consisting of the same and different alkyl groups having 1 to 4 carbon atoms; with the proviso that when R is H, the two carbon atoms in A and Z that are attached directly to the N atom therebetween each carry two hydrogen atoms.

2. A composition of matter comprising an addition copolymer of a compound of Formula I as defined in claim 1 with at least one other copolymerizable monoethylenically unsaturated monomer.

3. A composition of matter comprising a copolymer of a compound of Formula I as defined in claim 1 with methyl methacrylate.

4. A composition of matter comprising a copolymer of a compound of Formula I as defined in claim 1 with ethyl acrylate.

5. A composition of matter comprising a copolymer of a compound of Formula I as defined in claim 1 with acrylonitrile.

6. A composition of matter comprising a copolymer of a compound of Formula I as defined in claim 1 with styrene.

7. A composition of matter comprising α-(N-β-vinyloxyethylacetamido)propionitrile.

8. A composition of matter comprising N-β-vinyloxyethylformamidoacetonitrile.

9. A composition of matter comprising β-(N-ethoxycarbonyl-N-β-vinyloxyethylamino)propionitrile.

10. A composition of matter comprising α-(N-ethoxycarbonyl-N-β-vinyloxyethylamino)isobutyronitrile.

11. A composition of matter comprising a compound of Formula V:

(V) 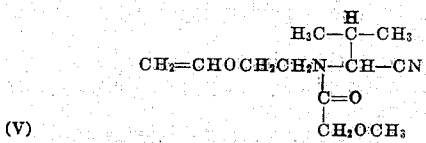

12. A method for producing a compound of Formula I as defined in claim 1 which comprises reacting an acyl halide of the formula RCOX wherein R is as defined in claim 1 and X is selected from the group consisting of chlorine and bromine with a compound of Formula II:

(II) 

wherein Z and A are as defined in claim 1.

13. A method for producing a compound of Formula I as defined in claim 1 which comprises reacting a compound of Formula II as defined in claim 12 with a member selected from the group consisting of alkyl formates and alkyl α-methoxyacetates.

14. A method for producing a compound of Formula I as defined in claim 1 which comprises reacting a member selected from the group consisting of benzyl chloroformates and alkyl chloroformates in which the alkyl group has 1 to 4 carbon atoms, with a compound of Formula II as defined in claim 12.

No references cited.